United States Patent [19]
Purdham et al.

[11] Patent Number: 5,822,766
[45] Date of Patent: Oct. 13, 1998

[54] MAIN MEMORY INTERFACE FOR HIGH SPEED DATA TRANSFER

[75] Inventors: David M. Purdham, Brooklyn Park; Mitchell A. Bauman, Circle Pines, both of Minn.

[73] Assignee: Unisys Corporation, Blue Bell, Pa.

[21] Appl. No.: 780,965

[22] Filed: Jan. 9, 1997

[51] Int. Cl.⁶ .............................. G06F 13/37; G06F 13/16
[52] U.S. Cl. ........................ 711/148; 395/863; 395/845; 395/846; 395/894; 395/878; 711/147; 711/167
[58] Field of Search .................................... 711/147, 148, 711/167; 395/845, 846, 863, 878, 894

[56] References Cited

U.S. PATENT DOCUMENTS

| | | |
|---|---|---|
| 3,641,505 | 2/1972 | Artz et al. . |
| 3,812,469 | 5/1974 | Hauck et al. . |
| 3,872,447 | 3/1975 | Tessera et al. . |
| 3,925,766 | 12/1975 | Bardotti et al. . |
| 4,056,844 | 11/1977 | Izumi . |
| 4,070,704 | 1/1978 | Calle et al. . |
| 4,130,865 | 12/1978 | Heart et al. . |
| 4,245,306 | 1/1981 | Besemer et al. . |
| 4,309,754 | 1/1982 | Dinwiddie, Jr. . |
| 4,349,871 | 9/1982 | Lary . |
| 4,426,681 | 1/1984 | Bacot et al. . |
| 4,437,157 | 3/1984 | Witalka et al . |
| 4,442,487 | 4/1984 | Flectcher et al. . |
| 4,481,572 | 11/1984 | Ochsner . |
| 4,525,777 | 6/1985 | Webster et al. . |
| 4,595,911 | 6/1986 | Kregness et al. . |
| 4,667,288 | 5/1987 | Keeley et al. . |
| 4,716,527 | 12/1987 | Graciotti . |
| 4,722,072 | 1/1988 | Price . |
| 4,755,930 | 7/1988 | Wilson, Jr. et al. . |
| 4,761,755 | 8/1988 | Ardini, Jr. et al. . |
| 4,794,521 | 12/1988 | Ziegler et al. . |
| 4,807,110 | 2/1989 | Pomerene et al. . |
| 4,807,183 | 2/1989 | Kung et al. . |
| 4,829,467 | 5/1989 | Ogata . |
| 4,843,541 | 6/1989 | Bean et al. . |
| 4,843,542 | 6/1989 | Dashiell et al. . |
| 4,860,192 | 8/1989 | Sachs et al. . |
| 4,860,198 | 8/1989 | Takenaka . |
| 4,868,818 | 9/1989 | Madan et al. . |
| 4,878,166 | 10/1989 | Johnson et al. . |
| 4,888,771 | 12/1989 | Benignus et al. . |
| 4,891,810 | 1/1990 | de Corlieu et al. . |
| 4,933,901 | 6/1990 | Tai et al. . |
| 4,956,820 | 9/1990 | Hashimoto . |

(List continued on next page.)

OTHER PUBLICATIONS

Wilson, Jr., "Hierarchical Cache/Bus Architecture for Shared Memory Multiprocessors", IEEE, 1987.

*Primary Examiner*—Tod R. Swann
*Assistant Examiner*—J. Peikari
*Attorney, Agent, or Firm*—Nawrocki, Rooney & Sivertson, P.A.

[57] ABSTRACT

An apparatus and method for transferring data sets between a storage controller and a number of daisy chained main memories on separate circuit elements at high speed. Each main memory has coupled control logic which receives a data set from the storage controller, latches and retransmits the data set to the next main control logic and coupled memory, which next control logic repeats the process, and which can be continued through a number of coupled control logic units and main memories. A data set includes a header with an address range and function information. If data is to be sent from the storage controller it is appended to the header. Each storage controller compares the address range with the address range of the coupled memory, and if within the address range and for a write, will store the appended data in the header address in the coupled memory. If within the address range and for a read, each storage controller will read the data addressed in the header from the coupled memory and return the data to the storage controller. Because of the direct access these transfer occur at high data rates. The limited number of connections used in this transfer permits accessing main memories on a circuit element using this apparatus and method.

12 Claims, 6 Drawing Sheets

U.S. PATENT DOCUMENTS

| | | |
|---|---|---|
| 4,959,782 | 9/1990 | Tulpule et al. . |
| 4,979,107 | 12/1990 | Advani et al. . |
| 4,984,153 | 1/1991 | Kregness et al. . |
| 4,985,832 | 1/1991 | Grondalski ................... 395/800.22 |
| 4,995,035 | 2/1991 | Cole et al. . |
| 5,014,197 | 5/1991 | Wolf . |
| 5,023,776 | 6/1991 | Gregor . |
| 5,025,365 | 6/1991 | Mathur et al. . |
| 5,025,366 | 6/1991 | Baror . |
| 5,053,947 | 10/1991 | Heibel et al. ................. 395/200.67 |
| 5,058,006 | 10/1991 | Durdan et al. . |
| 5,109,485 | 4/1992 | Smith, Jr. . |
| 5,113,522 | 5/1992 | Dinwiddie, Jr. et al. . |
| 5,125,081 | 6/1992 | Chiba . |
| 5,129,077 | 7/1992 | Hillis . |
| 5,148,533 | 9/1992 | Joyce et al. . |
| 5,165,018 | 11/1992 | Simor . |
| 5,170,472 | 12/1992 | Cwiakala et al. . |
| 5,175,824 | 12/1992 | Soderbery et al. . |
| 5,179,705 | 1/1993 | Kent . |
| 5,193,163 | 3/1993 | Sanders et al. . |
| 5,195,185 | 3/1993 | Marenin . |
| 5,202,966 | 4/1993 | Woodson . |
| 5,255,374 | 10/1993 | Aldereguia et al. . |
| 5,255,375 | 10/1993 | Crook et al. . |
| 5,255,378 | 10/1993 | Crawford et al. . |
| 5,265,257 | 11/1993 | Simcoe et al. . |
| 5,280,474 | 1/1994 | Nickolls et al. . |
| 5,303,382 | 4/1994 | Buch et al. . |
| 5,313,602 | 5/1994 | Nakamura . |
| 5,327,538 | 7/1994 | Hamaguchi et al. . |
| 5,375,220 | 12/1994 | Ishikawa . |
| 5,388,227 | 2/1995 | McFarland . |
| 5,444,847 | 8/1995 | Iitsuka . |
| 5,452,239 | 9/1995 | Dai et al. . |
| 5,471,592 | 11/1995 | Gove et al. . |
| 5,559,969 | 9/1996 | Jennings . |
| 5,603,005 | 2/1997 | Bauman et al. . |

| 52 |
|---|
| ADDRESS/FUNCTION |
| ADDRESS/FUNCTION |
| MSB WORD 0 + 2 FLAGS |
| MSB WORD 1 + 2 FLAGS |
| MSB WORD 2 + 2 FLAGS |
| MSB WORD 3 + 2 FLAGS |
| MSB WORD 4 + 2 FLAGS |
| MSB WORD 5 + 2 FLAGS |
| MSB WORD 6 + 2 FLAGS |
| MSB WORD 7 + 2 FLAGS |

56, 58, 60, 62, 64, 66, 68, 70, 72, 74

| 54 |
|---|
| ADDRESS/FUNCTION |
| ADDRESS/FUNCTION |
| LSB WORD 0 + 2 FLAGS |
| LSB WORD 1 + 2 FLAGS |
| LSB WORD 2 + 2 FLAGS |
| LSB WORD 3 + 2 FLAGS |
| LSB WORD 4 + 2 FLAGS |
| LSB WORD 5 + 2 FLAGS |
| LSB WORD 6 + 2 FLAGS |
| LSB WORD 7 + 2 FLAGS |

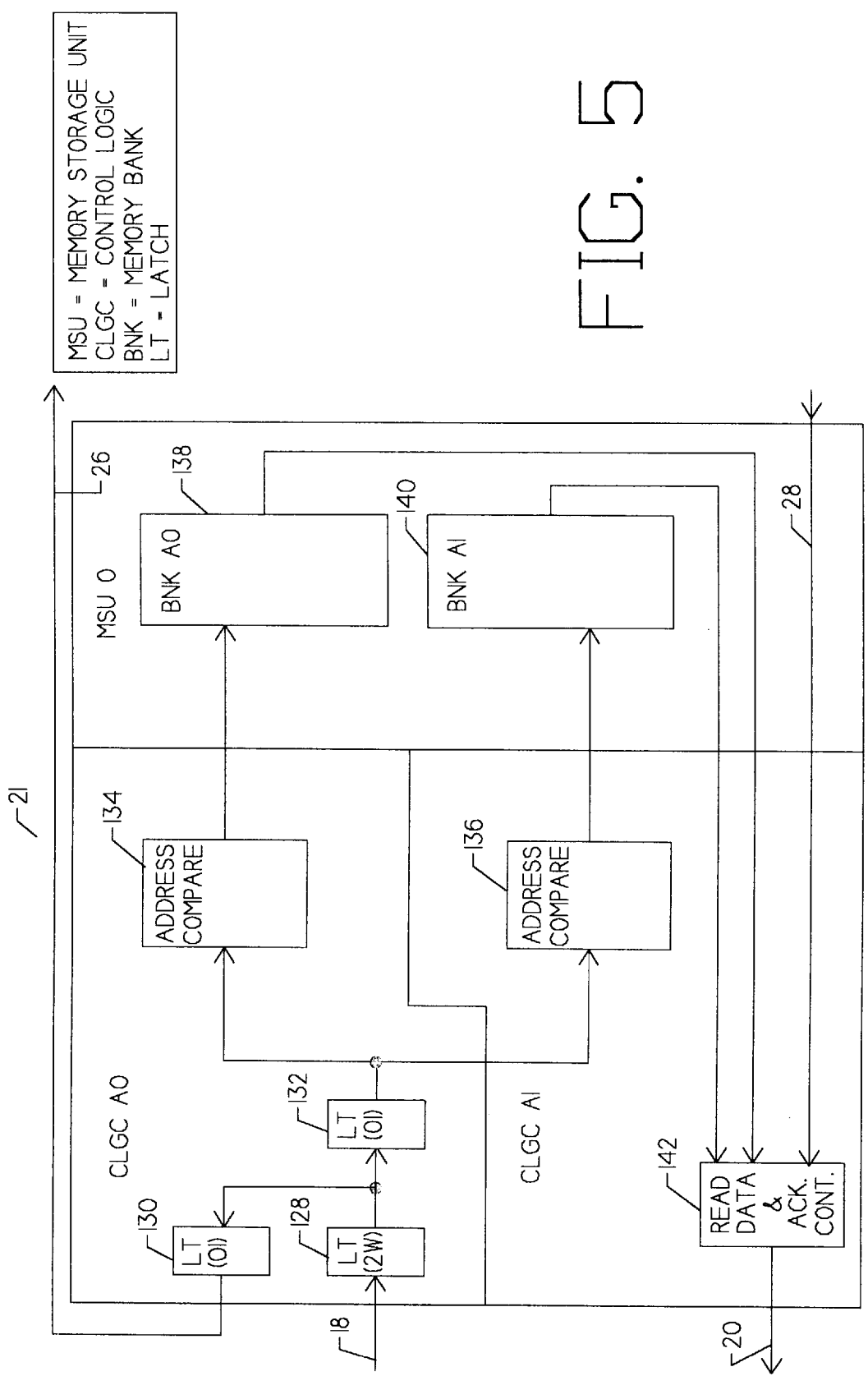

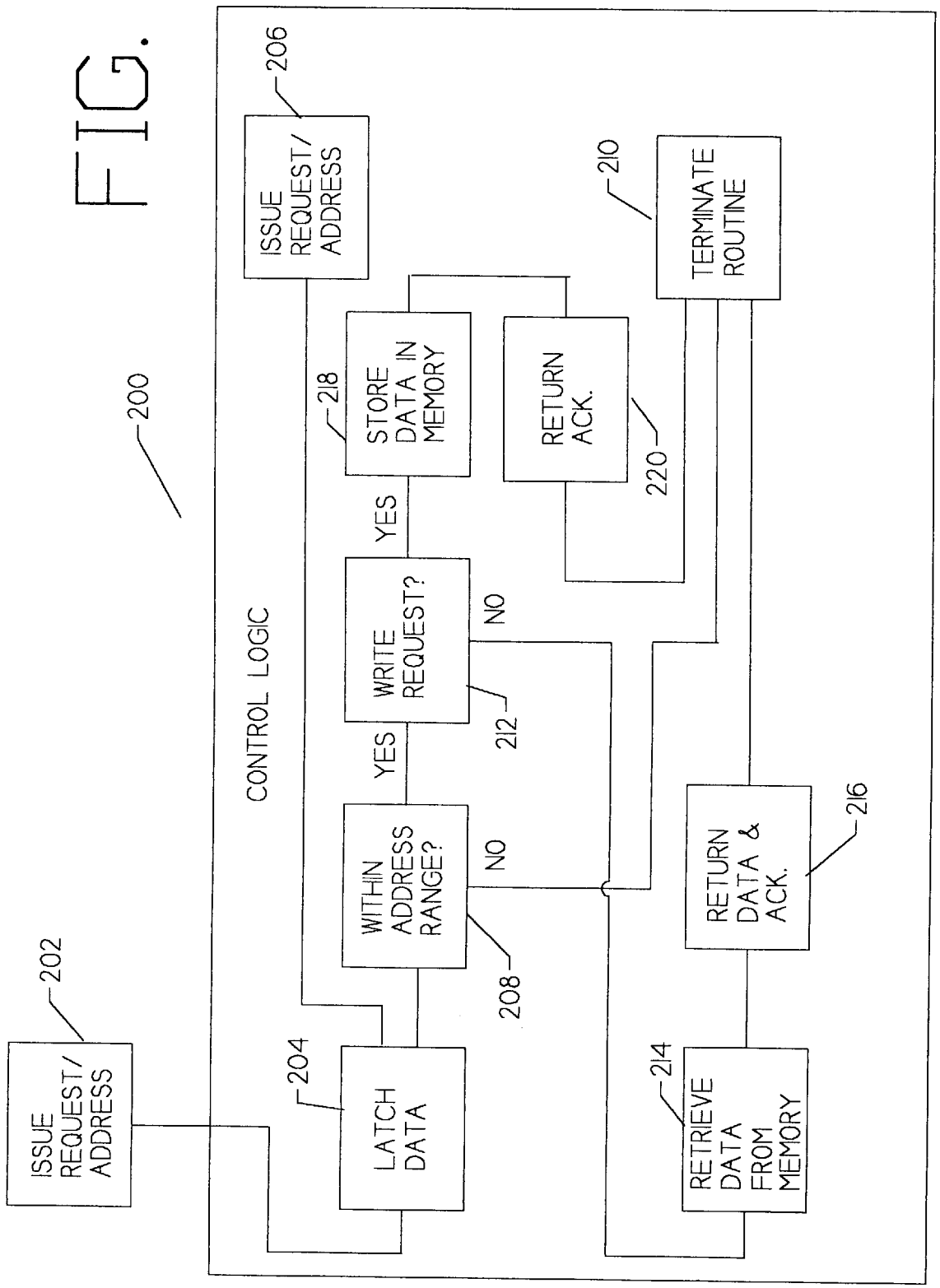

MAIN MEMORY INTERFACE FOR HIGH SPEED DATA TRANSFER

CROSS REFERENCE TO CO-PENDING APPLICATIONS

The present application is related to U.S. Pat. application Ser. No. 08/780,966, filed Jan. 9, 1997, entitled "Priority Logic for Selecting and Stacking Data", which is assigned to the assignee of the present invention and is incorporated herein by reference

BACKGROUND OF THE INVENTION

1. Field of the Invention

This invention generallyrelates to memory management systems for data processing systems and more particularly to accessing a number of main memories from data processors using high speed point-to-point data transfer.

2. Description of the Prior Art

The most commonmethod of accessing a number of main memories is through a bus where data processors address all main memories through the bus. This approach provides direct access to all main memory but at a cost of greatly reduced access speed. Bused structures generally involve latency time as one entity relinquishes bus control and another entity begins driving the bus. Bussed structures also involve arbitration which is another source of latency. Bussed structures usually have a settling time which may slow the effective data transfer rate. In addition, many main memories are not located upon individual circuit elements. The large number of interface connections required by the bus is inconsistent with the requirement for a minimum number of input/output data pins for the circuit element architecture. Thus, it would be desirable if a large number of main memories, each located upon a different memory circuit element, could be accessed and memory contents transferred at a high data rate.

SUMMARY OF THE INVENTION

Typical large processing systems use a number of processors interfaced with main memory through a storage controller. The storage controller and main memory interfaces are usually provided on separate circuit elements. When a large amount of main memory is interfaced with storage controller circuit elements, the limited number of pins available on an individual circuit element for interfacing presents a problem. Past solutions used a bus interface to minimize the number of interface pins required. When a number of memories are to be interconnected in this manner, however, the loading caused by the memories and the inherent latency of the bus greatly slows, the data transfer rate between the memories and the storage controller.

The present invention permits interconnecting a number of main memories with a storage controller using a minimum number of pins while still retaining a high data transfer rate. The invention uses a point-to-point interface between a storage controller and a number of memory circuit elements arranged in a daisy chain. Each circuit element incorporates high speed transfer control logic and a connected memory. The transfer between successive circuit elements occurs in a sequential manner at high speed between the logic elements.

In this arrangement data is transmitted from a storage controller circuit element to a first circuit element containing first control logic, which is part of and is coupled to a first main memory. The first control logic latches the data on a given timing signal and transfers it to a second circuit element containing second control logic which is coupled to a second main memory. The second control logic latches the data on a given timing signal and transfers it to a third circuit element containing third control logic which is coupled to a third main memory.

With this arrangement data is transmitted between successive memory circuit elements with only a small timing delay at each memory circuit element. This permits accessing a large number of main memories in the chain at the same high speed using a minimum number of pins for interfacing on each circuit element. Essentially any practical number of memory circuit elements can be tied together in this manner.

A data transmission consists of 20-bit data parallel transmissions, two if for a read and eighteen if for a write.

The first two transmissions contain a two word header containing a memory address range and function information which indicates whether data is to be read from memory or written into memory. The data transmission is sent on automatically to the next control logic and coupled memory.

After the first two transmissions have been received containing the memory address and function information, the control logic examines the address to determine whether it is within the address range of coupled memory. If not, no further action is taken. If the data is within the memory address range, the control logic then determines whether the function is for reading or writing data. If a data write is requested, each subsequent transmission following the address is written into the local memory at the designated addresses on subsequent timing signals. After the last transmission has been stored, an acknowledge is sent back to the storage controller from the control logic to indicate that the transmitted data has been stored in main memory, which completes the write data transmission.

If a data read was requested, the control logic then uses the data address to obtain the data from the main memory using the transmitted addresses, and send it back to the storage controller. The control logic transmits an acknowledge which begins the read transmittal, after which all of the data is sent.

Words are transmitted at 11 nanosecond spacings and latched, re-latched and retransmitted to the next control logic in two such spacings. This results in a minimum time delay at each memory circuit element and a high data rate. Since each subsequent control logic repeats this process the total time delay is only a few multiples of 11 nanoseconds. This allows a number of main memory circuit elements to be connected together in a daisy chain without the total time delay becoming excessive. Since each main memory circuit element is essentially isolated from the others, there is no load or latency problems as in bus architecture. This permits the extension of the daisy chain to any number of memories with no load problem. This arrangement permits data transmission down the memory daisy chain at the high speed of the data channel with a minimum delay at each intermediate main memory circuit element.

BRIEF DESCRIPTION OF THE DRAWINGS

Objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 4 is a listing of data sets which are transferred between elements in the present invention;

FIG. 5 is a block diagram showing the logic elements for control logic of the present invention; and FIG. 6 is a diagram showing the control operations.

DETAILED DESCRIPTION OF THE PREFERRED EMBODIMENTS

Figure 1:
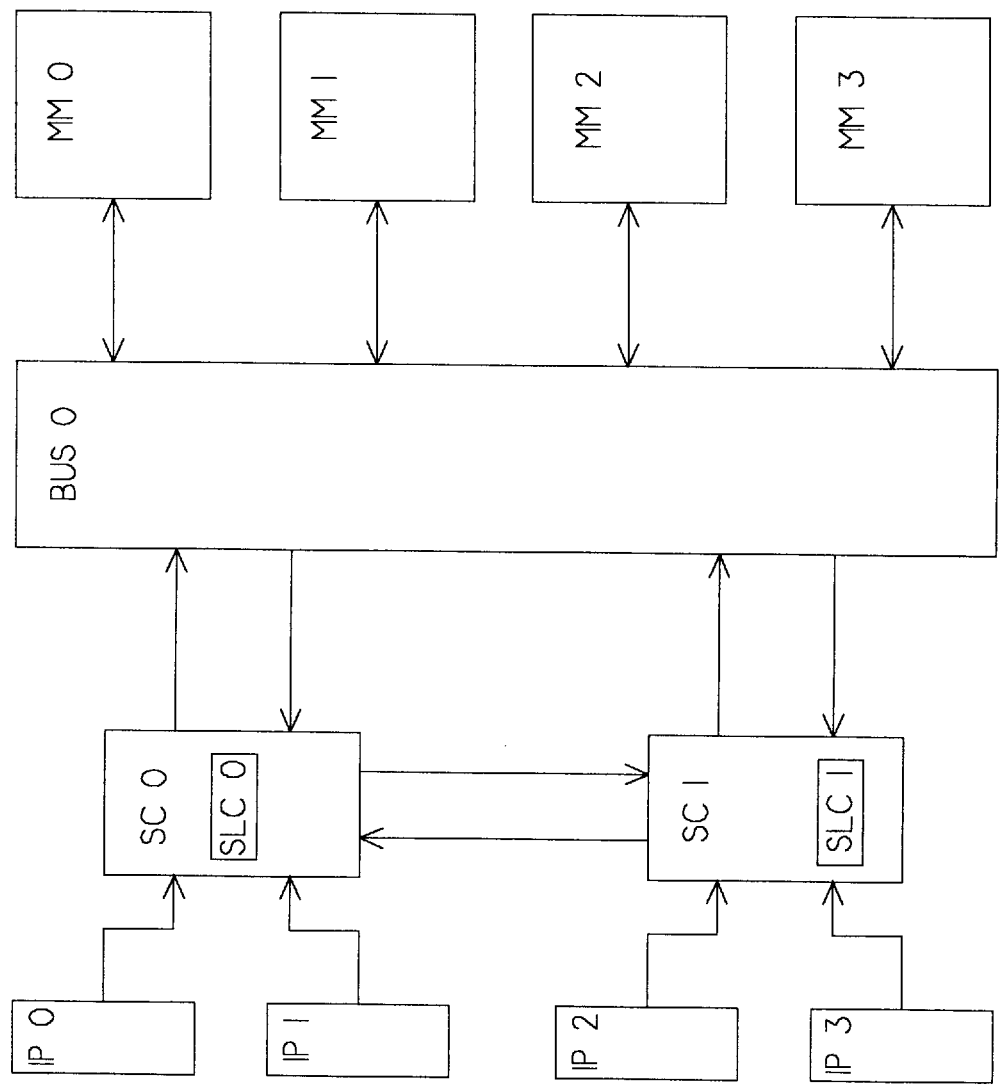
FIG. 1 is a block diagram of representative prior art.

FIG. 1 is illustrative of representative prior art where a single Bus 0 provides an interface between Main Memories 1, 2, 3 and 4 and Storage Controllers (SC) 0 and 1. SC 0 provides an interface between Bus 0 and Instruction Processors (IP) 0 and 1, and SC 1 provides an interface between Bus 0 and IPs 2 and 3. The large number of lines and the necessity of propagating addresses through the bus to individual main memories plus the time required for resolving multiple requests and redirecting the data flow results in a large latency and access time.

Figure 2:
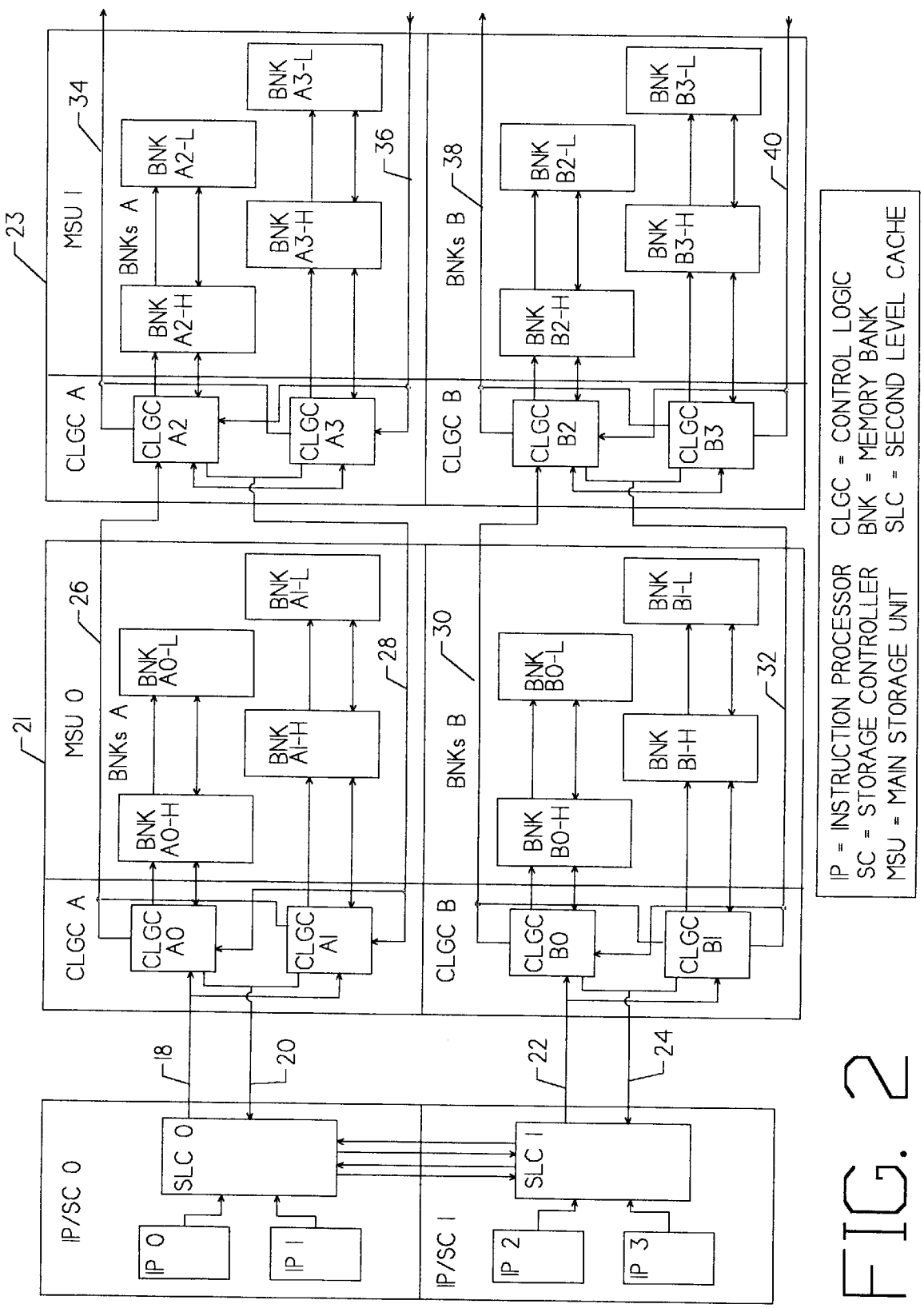
FIG. 2 is a block diagram of a multi-processor, multi main memory data processing system in which the present invention is embodied.

FIG. 2 illustrates the present invention using essentially the same elements as in FIG. 1, however here two separate circuit elements 21 and 23 with each circuit element containing two separate control logic sections and interconnected memories which are substituted for the bus and four separate main memories of the prior art. As before, IP 0 and IP 1 interconnect with second level cache (SLC) 0 in IP/SC 0, and IP 2 and IP 3 interconnect with SLC1 in IP/SC 1. Here however circuit element 21 contains a Main Storage Unit (MSU) 0 with two Memory Banks (BNKs) A and B, and two separate Control Logic blocks (CLGCs) A and B. BNK A is divided into BNKs A0 and A1, and BNK B is divided into BNKs B0 and B1. BNK A0 is further divided into a High BNK A0-H, and a Low BNK A0-L and BNK A1 is divided into a High BNK A1-H, and a Low BNK A1-L. BNK B0 is also divided into B0-H, and B0-L, and BNK B1 is also divided into B1-H, and B1-L, all being interconnected as shown.

CLGC A provides all of the logic operations and the high speed interface apparatus for Memory Banks A and CLGC B for Memory Banks B. The Low Bank portions are accessed by their respective Control Logic in parallel with the high portions. Memory banks A store half of each of eight words in a data transmission, and memory banks B store the other half of each of the eight words at the same time. All of the A Banks interface with the A Control Logic and all of the B banks interface with the B Control Logic.

Circuit element 23, which operates in the same manner with the same elements, contains MSU 1 with BNKs A and B, and CLGCs A and B. BNK A is divided into BNKs A2 and A3, and BNK B is divided into BNKs B2 and B3. BNK A2 is further divided into a High BNK A2-H, and a Low BNK A2-L and BNK A3 is divided into a High BNK A3-H, and a Low BNK A3-L. BNK B2 is divided into B2-H, and B2-L, and BNK B3 is divided into B3-H, and B3-L, all being connected as shown.

CLGC A and CLGC B of MSU 0 communicate with CLGC A and CLGC B of MSU 1 over lines 26, 28 and lines 30, 32 respectively.

Additional units of Control Logic and Main Memory, the same as provided by circuit element 21 and circuit element 23, can be interconnected over lines 34, 36, 38 and 40 respectively in the same manner that circuit element 23 is connected to circuit element 21 to provide extended memory capability. Outgoing lines 18, 22, 26, 30, 34 and 38 consist of 23 lines, 1 connection for a single bit Request and 22 lines for parallel consecutive transmissions of a number of 20-bit write data segments plus 2 parity bits. Incoming lines 20, 24, 28, 32, 36 and 40 consist of 25 lines, 2 lines for three 2-bit parallel Read Acknowledge transmissions, one line for a serial 6 bit Write Acknowledge transmission, and 22 lines for parallel consecutive transmissions of a 20-bit read word plus 2 parity bits. The read and write data transmissions will be described later.

Figure 3:
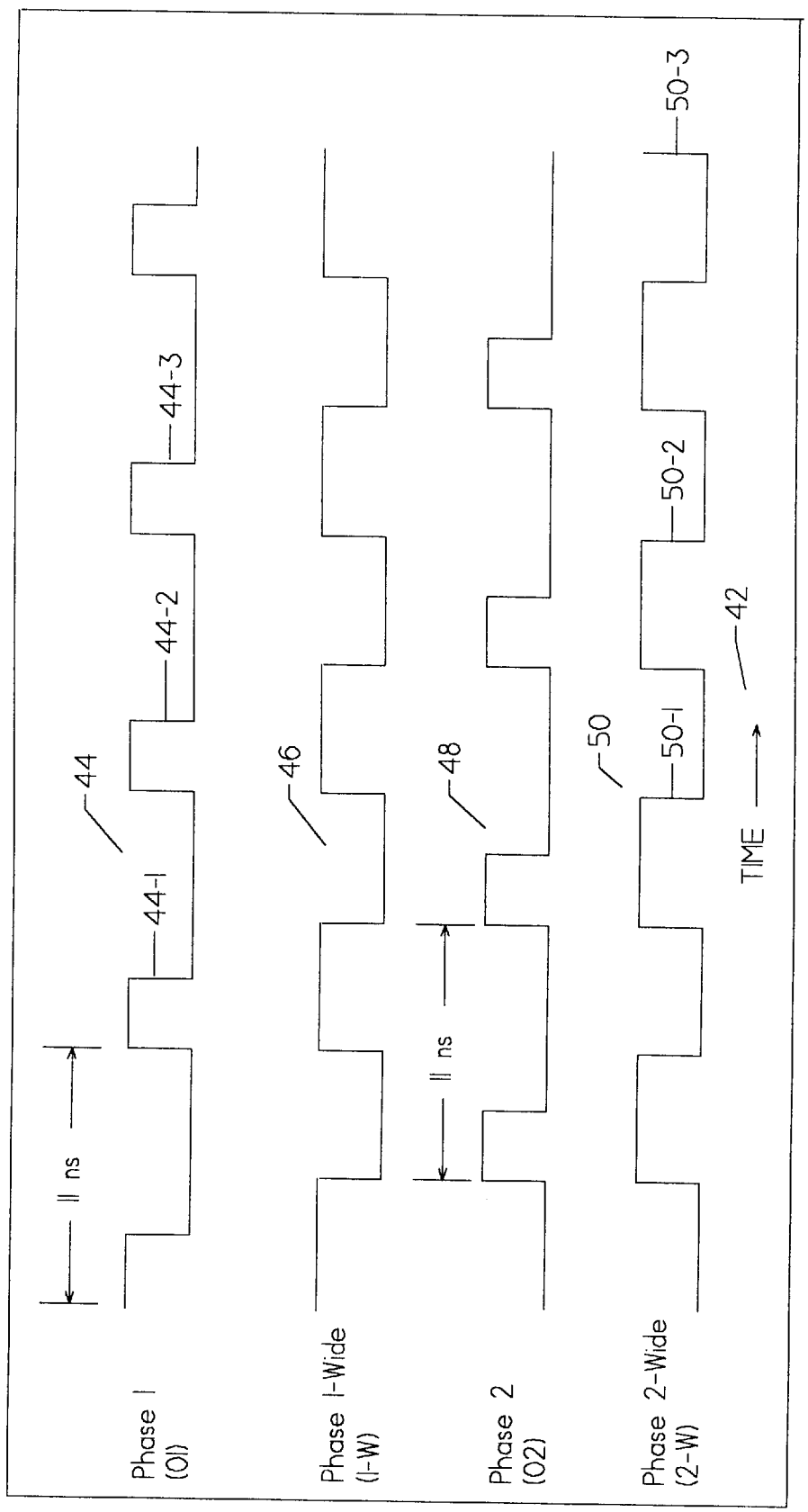
FIG. 3 is a timing diagram of the timing signals used.

Each Storage Controller also provides the timing signals shown in FIG. 3 which indicate to the Control Logic when a particular signal is to be latched. Time 42 is plotted from left to right. Phase 1 (01) signal 44, which provides a latching timing signal, has an 11 nanosecond cycle time, as do all of the other signals. Phase 1-Wide (1-W) signal 46, Phase 2 (02) signal 48, and Phase 2-Wide (2-W) signal 50 provide other latching signals. These will be described further in the overall system operation. Using timing signals with an 11 nanosecond cycle time to coordinate the transmission operations permits transferring words between circuit elements at a high data rate.

The data transmitted sequentially in parallel 22-bit data segment format from SLC 0 over lines 18 and from SLC 1 over lines 22 are shown in FIG. 4 respectively in words 56 through 74 in column 52 and words 92 through 110 in column 54.

In column 52 words 56 and 58, and in column 54 words 92 and 94 contain the first and last addresses of a data address range and function information whether the transmission for writing into memory or for reading from memory.

In column 52, words 60, 62, 64, 66, 68, 70, 72 and 74 each contain the most significant 18 data bits plus 2 parity bits and words 96, 98, 100, 102, 104, 106, 108 and 110 each contain the least significant 18 data bits plus 2 parity bits of a 36-bit word. Thus, each sequential pair of words 60–96, 62–98, 64–100, 66–102, 68–104, 70–106, 72–108, and 74–110 provide a full 36-bit word.

FIG. 5 shows the logic elements of the Control Logic for CLGC A of circuit element 21, and FIG. 6 shows the sequence of logic steps and operations for the logic elements of the Control Logic. While this description is directed to only CLGC A of circuit element 21, this description is also applicable to all other Control Logic operations, which includes CLGA B of circuit element 21, and CLGA A and CLGA B of circuit element 23.

For a write operation, SLC 0 and SLC 1 transmit respectively and sequentially, all the words of columns 52 and 54 of FIG. 4. In a read operation only the first two words of each column are transmitted, since the eight 20-bit words are read from memory rather than written to memory. In a write and read operation, SLC 0 and SLC1 transmit simultaneously and separately over their respective lines 18 and 22, and in a read operation receive simultaneously and separately over respective lines 20 and 24. Since each line transmitted is 20 bits wide this provides a 40 bit parallel word transmission capability to circuit element 21 from SLC 0 and SLC 1 over lines 18 and 22 respectively, and from circuit element 21 to SLC 0 and SLC 1 over lines 20 and 24 respectively.

FIGS. 3, 4, 5 and 6 together provide a description of data transmissions between SLC 0 and CLGC A. This description also describes the transmission process for transmitting data between SLC 1 and CLGC B, and between all CLGCs. The SLC 0 data transmission begins when SLC 0 raises the Request bit on its line in lines 18, which initiates the data transfer, after which the words in column 52 are latched consecutively into a latch in SLC 0, not shown. This latching automatically transmits the latched word over lines 18 on each falling of timing signal 44, indicated as 44-1, 44-2 and 44-3. Timing signal 44 ensures that each data word is transmitted at a predetermined time interval.

In column 52 header words 56 and 58 each contain 22-bits, 20 bits of data and two flag bits. A portion of the 20-bit portion of word 56 provides the beginning address of the function. Other bits of words 56 and 58 indicate the transmission function, whether for reading or writing data. The following word MSBs 60, 62, 64, 66, 68, 70, 72 and 74 in column 52, each contain the most significant 18 data bits plus 2 flag bits. If the function is for writing, all word MSBs 60, 62, 64, 66, 68, 70, 72 and 74 from column 52 are transmitted, while if the function is for reading, only words 56 and 58 of column 52 and 92 and 94 of column 54 are sent. For a write function words 56 through 74 constitute a complete data set, while for a read function words 56 and 58 constitute a complete data set. Only the transferral of information between SLC 0 and CLGC A is described here, however, the functions and operations of CLGC B of Circuit element 21, and CLGC A and CLGC B of circuit element 23 are the same.

Data transmission operations 200 for SLC 0 and CLGC A are shown in FIG. 6. The above described data transmission from SLC 0 to CLGC A, of words 56 through 74 for write or words 56 and 58 for read, is shown in FIG. 6 as Issue/Request Address step 202.

The interconnections of the various logic functions of CLGC A are shown in FIG. 5. CLGC A was activated by the Request bit transmitted from SLC 0 over lines 18. LT 128 then latches each word received over lines 18 on falling (2-W) timing signal 50. LT 130 and LT 132 each latch each subsequent word previously latched into LT 128, on the next falling (01) timing signal 44. Latching a data word into LT 130 transfers that word over lines 26 to the latch identical to LT 128 in circuit element 23. Address Comparators 134 and 136 compare the transmitted address range with the respective address ranges of BNK A0 and BNK A1. Read data and acknowledge control 142 transmits data read from memory over line 20 for a read function, and transmits an acknowledge to indicate completion of a read or write function to the SLC 0.

With this arrangement, SLC 0 will latch consecutive words of a data set into a latch on (01) falling timing signals 44, which are transferred to circuit element 21 over lines 18 to be consecutively latched into LT 128 on subsequent falling (2-W) timing signals 50, which will then be consecutively latched into LT 130 and LT 132 on subsequent falling (01) timing signals 44. Each 22-bit data word latched into LT 128 is transferred and latched both into 22-bit LT 130 and 22-bit LT 132 on the next subsequent falling (01) timing signal 44. As an example, a first word of a data set latched into SLC 0 on falling (01) timing signal 44-1, will then be latched into LT 128 on falling (2-W) timing signal 50-1, and will then be latched into LT 130 and LT 132 on falling (01) timing signal 44-3. The second word of a data set will be latched into SLC 0 on falling (01) timing signal 44-2, will be latched into LT 128 on falling (2-W) timing signal 50-2, and will be latched into LT 130 and LT 132 on falling (01) timing signal 44-4. In FIG. 6 these latching steps are indicated by Latch Data step 204.

Data transferred from circuit element 21 to circuit element 23 is performed in Issue Request/Address step 206, and occurs whenever a data word is latched into LT 130. This latching transfers the information received over lines 18 to CLGC A of circuit element 23 over lines 26. The Control Logic performs the same way in circuit element 23 as circuit element 21 and the previous description applies there also.

After the first two header words, 56 and 58, in the data set have been received by Lt 132 in Latch Data step 204, the address range is then available to be compared by Address Compare blocks 134 and 136 for BNK A0 and BNK A1 respectively. This is performed by entering Within Address Range? step 208 after receipt of the first two words of the data set.

If the address is out of range for BNK A0 or BNK A1, then Terminate Routine step 210 is entered which will terminate the routine.

If the address is within the range of BNK A0 or BNK A1, then Write Request? step 212 is entered which uses the function information in words 56 and 58 to determine whether the function is read or write. If the function is read, then Retrieve Data from Memory 214 step is entered which will use the transmitted address range to retrieve the data words addressed from either BNK A0 or BNK A1, whichever is within the address range.

Control is then transferred to Return Retrieved Data & Acknowledge step 216. Step 216 uses the Read & Acknowledge Control block 142 to transfer the data words read over lines 20. After the data words have been sent then six bits made up of three parallel 2-bit acknowledgments are then sent over the 2 lines dedicated to that purpose in lines 20 and Terminate Routine step 210 is then entered to terminate the read process.

If the request was for a write in block 212 then control is passed to Store Data in Memory step 218. This causes the word MSBs 60, 62, 64, 66, 68, 70, 72 and 74 to be successively transmitted after words 56 and 58 to LT 132 to be successively read into the transmitted address range in BNK A0 or BNK A1.

After word MSB 74 of the data set has been read into the appropriate Memory Bank, then Read & Acknowledge and Acknowledge Control block 142 is used to perform Return Acknowledge step 220. Since the function is not for read, there is no data to transfer, so on step 220 only the six bit write acknowledgment is sent to SLC 0 over lines 20. Terminate Routine step 210 is then entered which terminates the write process routine.

This arrangement provides high speed interfacing between MSU 0 and MSU 1 with no combined loading of the two memories because of their isolation from each other by the Control Logic units. The data rate, determined by the 11 nanosecond timing signal, is quite high at approximately 90 megahertz. Further, even if the number of main memories in use is extended greatly, there will still be no combined memory loading and the data rate will remain at the same data rate.

This embodiment has two Storage Controllers with each accessing one Main Memory Bank through another Main Memory Bank. Each single circuit element 21 or 23 contains two Control Logic units and a Main Memory Bank coupled to each Control Logic unit. This permits use of a minimum number of pins on each circuit element and provides the high speed advantage of the present invention.

A number of other circuit element arrangements are possible however. A first circuit element could contain Instruction Processors, a Second Level Cache, and a Control Logic unit coupled to a first Main Memory, which interfaces with a second circuit element containing a single Control Logic unit coupled to a second Main Memory. The second circuit element, in turn, could interface with a third circuit element also containing, a single Control Logic unit coupled to a third Main Memory. This alternative arrangement is illustrative of other arrangements possible with this invention.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. An improvement to the memory management of a data system including a storage controller with means for transferring a transmitted data set of a number of data words, the transmitted data set including a header with address range and transmission function information, and also including means for receiving a data set of a number of data words, the data system further including at least two memories, each memory having a predetermined address range, the improvement being coupled to each memory and comprising:
    a) receiving means for receiving a data set including a header with address range and transmission function information from a first apparatus;
    b) transmitting means for retransmitting said received data set to a second apparatus;
    c) determining means for determining whether the transmitted address range is within the address range of the coupled memory;
    d) function determining means, operative when the transmitted address range is within the address range of the coupled memory, for determining the transmission function;
    e) write means, operative when the transmitted address range is within the address range of the coupled memory and when the transmission function is for a write operation, for storing transmitted data words, other than the header words providing address and function information, in the coupled memory in the memory locations which are designated by the transmitted address range; and
    f) read means, operative when the transmitted address range is within the range of the coupled memory and when the transmission function is for a read operation, for reading data words from the coupled memory, in the memory locations which are designated by the transmitted address range, and transmitting said data words to said first coupled apparatus.

2. The improvement as in claim 1 wherein said storage controller further includes means for receiving an acknowledgement indicating the successful completion of said function, and wherein said improvement further comprises means for sending an acknowledgment to said first coupled apparatus upon the successful completion of said function.

3. The improvement of claim 1 wherein the data system storage controller further includes means for transmitting a request signal before transmitting said data set to indicate the beginning of a data set transmission, said improvement further comprising means for receiving said request signal and using said request signal to indicate the beginning of a data set transmission.

4. The improvement of claim 1 wherein the data system further includes means for transmitting each word of a data set successively and in synchronism with a first repeating timing signal having a given cycle time; said improvement receiving means further comprising means for successively receiving and latching each word of a data set in synchronism with a second repeating timing signal, each signal being delayed a predetermined first amount of time from said first repeating timing signal; and said improvement transmitting means further comprising means for retransmitting each word of said received data set in synchronism with a third repeating timing signal, each signal being delayed a predetermined second amount of time from said first timing signal.

5. A data system comprising a storage controller having transmission apparatus arranged to transfer a data set of a number of words, the data set having a header of address range and transmission function information, and further having receiving apparatus arranged to receive a data set of a number of words; said data system further comprising at least two memories with each memory having a predetermined address range, and also comprising memory management apparatus coupled to each memory comprising:
    a) receiving apparatus arranged to receive a data set having a number of words from a first apparatus including a header with address range and transmission function information;
    b) transmitting apparatus arranged to retransmit said data set to a second apparatus;
    C) logic determining apparatus arranged to determine whether said transmitted address range is within the address range of the coupled memory;
    d) function determining apparatus, operative when the transmitted address range is within the range of the coupled memory, arranged to determine the transmission function;
    e) write apparatus, operative when the transmitted address range is within the range of the coupled memory and when the transmission function is for a write operation, arranged to store the transmitted data words of a data set, other than header words providing address and function information, in the coupled memory in the memory locations designated by the transmitted address range; and
    f) read apparatus, operative when the transmitted address range is within the range of the coupled memory and when the transmission function is for a read operation, arranged to read data words from the coupled memory from memory locations which are designated by the transmitted address range, and transmit said data words to said first apparatus.

6. A data system as in claim 5 wherein said storage controller further comprises apparatus arranged to receive an acknowledgment indicating the successful completion of a data set transfer, and wherein said memory management apparatus further comprises acknowledgment transmission apparatus arranged to send an acknowledgment to said first coupled apparatus.

7. Apparatus as in claim 5 wherein said system controller transmission apparatus further comprises apparatus arranged to transmit a request signal before transmitting said data set to indicate the beginning of a data set transmission, and wherein said memory management apparatus further comprising apparatus arranged to receive a request signal and use said request signal to indicate the beginning of a data set transmission.

8. Apparatus as in claim 5 wherein said data system apparatus further includes timing apparatus arranged to generate a first repeating timing signal having a predetermined cycle time, arranged to generate a second repeating timing signal having the same cycle time but with each signal being delayed a first amount of time after each said first repeating timing signal, and arranged to generate third repeating timing signal having the same cycle time but with each signal being delayed a second amount of time after each said first repeating timing signals, said transmission apparatus further comprising apparatus arranged to transmit each word of a data set successively and in synchronism with a said first repeating timing signal; said receiving apparatus further comprising apparatus arranged to successively receive and latch each word of a data set in synchronism with said second repeating timing signal; and said transmitting apparatus further comprising apparatus arranged to retransmitting each word of said received data set in synchronism with said third repeating timing signal.

9. In a data system including a storage controller having means for transferring data words having a header with an address range and transmission function information, and for receiving data words, and further including at least two memories, each memory having a predetermined address range, and including a memory management system coupled to each memory, the method of transferring data to and from said data transmission system comprising the steps of:

a) receiving a data set from a first apparatus including a header with address range and transmission function information;

b) transmitting said data set to a second apparatus;

C) determining whether said transmitted address range is within the address range of the coupled memory;

d) determining the transmission function, operative when the transmitted address range is within the range of the coupled memory;

e) storing the data set, when the transmitted address range is within the address range of the coupled memory and when the transmission function is for a write operation, other than the data words providing address and function information, in the coupled memory in the memory locations which are designated by the transmitted address range; and f) reading data words from the coupled memory in the memory locations which are designated by the transmitted address range, when the transmitted address range is within the range of the coupled memory and when the transmission function is for a read operation, and transmitting said data words to said first coupled apparatus.

10. The method of claim 9 further comprising sending an acknowledgment to said first coupled apparatus upon the successful completion of said function.

11. The method of claim 9 further comprising transmitting a request signal before transmitting a data set to indicate the beginning of a data set transmission.

12. The method of claim 9 further comprising:

a) transmitting each word of a data set successively and in synchronism with a repeating first timing signal having a given cycle time;

b) latching each word of a data set in synchronism with a second repeating timing having the same cycle time as the first timing signal but with each signal being delayed a predetermined first amount of time from each first timing signals; and c) retransmitting each word of said received data set in synchronism with a third timing signal having the same cycle time as the first timing signal but with each signal being delayed a predetermined second amount of time from each first timing signals.

* * * * *